United States Patent [19]
Williford

[11] Patent Number: 6,079,721
[45] Date of Patent: Jun. 27, 2000

[54] STEERING MECHANISM FOR NON-RIDING GROUND ENGAGING EQUIPMENT

[75] Inventor: Henry G. Williford, Dothan, Ala.

[73] Assignee: Brown Manufacturing Corporation, Ozark, Ala.

[21] Appl. No.: 08/896,422

[22] Filed: Jul. 18, 1997

[51] Int. Cl.⁷ ........................................................ B62D 7/00
[52] U.S. Cl. .................................. 280/93.51; 280/47.11; 280/771
[58] Field of Search .................... 280/47.11, 771, 280/93.502, 93.51, 89, 89.11, 89.12; 172/35, 42, 107, 14, 116

[56] References Cited

U.S. PATENT DOCUMENTS

| | | | |
|---|---|---|---|
| 2,055,147 | 9/1936 | Furey | 280/47.11 |
| 2,975,839 | 3/1961 | Burrows et al. | 172/42 |
| 3,047,086 | 7/1962 | Mayr | 180/429 |
| 3,066,945 | 12/1962 | Prescott | 280/47.11 |
| 3,452,823 | 7/1969 | Shapland | 172/42 |
| 3,460,629 | 8/1969 | Shapland | 172/42 |
| 3,630,010 | 12/1971 | Rester | 56/13.5 |
| 4,678,042 | 7/1987 | Barton et al. | 172/15 |
| 5,226,248 | 7/1993 | Pollard | 37/94 |
| 5,297,379 | 3/1994 | Smith | 56/11.8 |
| 5,355,597 | 10/1994 | Pollard | 37/94 |
| 5,411,102 | 5/1995 | Nickels et al. | 172/781 |
| 5,529,316 | 6/1996 | Mattila | 280/93.51 |
| 5,603,583 | 2/1997 | Jackson | 280/93.51 |

*Primary Examiner*—J. J. Swann
*Assistant Examiner*—Michael Cuff
*Attorney, Agent, or Firm*—Sterne, Kessler, Goldstein & Fox P.L.L.C.

[57] ABSTRACT

A steering mechanism for use on non-riding equipment for steering a pair of ground-engaging wheels through movement of a steering member. The steering mechanism is configured so that both of the pair of wheels move together. An axle, preferably a substantially L-shaped axle, is coupled to each of the pair of wheels. A steering controller is coupled to one of the axles. Movement of the steering member is translated by the steering controller to cause that one axle to turn. The two axles are coupled together by an axle coupling means. The axle coupling means causes the other axle to turn in response to turning of the one axle that is coupled to the steering controller. This results in steering movement with both of the pair of wheels moving together. The steering mechanism can be equipped with a steering lock that locks the steering member and the pair of wheels in a fixed position. The steering mechanism can be used on various types of non-riding equipment to make them steerable.

9 Claims, 6 Drawing Sheets

STEERING MECHANISM FOR NON-RIDING GROUND ENGAGING EQUIPMENT

BACKGROUND OF THE INVENTION

1. Field of the Invention

The present invention relates to steering mechanisms. More particularly, the present invention relates to steering mechanisms for use on non-riding, ground engaging equipment.

2. Related Art

Various types of non-riding, ground engaging equipment are used in agricultural, arboricultural, and horticultural applications. By "non-riding" is meant a piece of equipment on which the operator or user does not actually sit or ride. Rather, the operator of such equipment typically pushes or pulls it over the surface of the ground. Such equipment can be powered, for example by an engine, or non-powered. Examples of this type of equipment include mowers, edgers, and trenchers.

The need to dig a trench arises for many different reasons. Trenches are needed for the installation of underground sprinkler systems, and for burying of cable, pipe, or wire. These types of trenches typically have two vertical faces. A "bed defining" trench is often used between shrubbery beds and grass areas to define the extent of the shrubbery bed. The bed defining trench also serves as a dam to hold the mulch in the bed, and permits the top of the mulch to be at the level of the grass. The bed defining trench serves to provide a clear separation of the shrubbery beds from the remainder of the landscape. The shrubbery beds can then be covered with mulch, or treated with chemicals, to prevent grass from growing. Ideally, a bed defining trench has a straight vertical face adjacent the sod or grass area, and a sloping face that extends toward the shrubbery bed.

In some applications it is desired to dig a trench that runs in a line that is nearly perfectly straight. Such a straight trench is often needed when laying cable, pipe, or wire, but can also be required for bed defining trenches in a landscaping application. It is very often necessary in landscaping applications to be able to dig a bed defining trench that includes graceful and smooth arcs and curves, as well as circular tree rings.

Various non-riding trenchers have been developed for digging vertical trenches and for digging bed defining trenches. Such trenchers typically have a handle at one end of the device that allows the operator to either pull or push the device over the surface of the ground. In one type of device, the trencher has a pair of wheels at the end of the device remote from the operator, and a single caster-like wheel at the handle end of the device adjacent the operator. In one such device, the single wheel swivels independently of the handle. As such, none of the wheels of the trencher can be steered by the operator. Consequently, the trenches dug by the trencher are not straight. Additionally, to produce arcs or curves, the trencher must be dragged over the surface of the ground. When the single swivel wheel hits a rock or other obstacle, it is very difficult to keep the trencher on a curved course. As such, it cannot easily be used to produce smooth, graceful curves and arcs.

In another type of trencher that has a single wheel at the handle end, the handle is formed by the forks of the single caster wheel. However, the control provided by this single wheel is insufficient to produce smooth, graceful curves. Additionally, devices that have a single wheel at the handle end are not as stable as devices that have a pair of wheels at each end. This stability problem is particularly acute when the device is being used to produce arcs and curves, and when the device is being used on a hill or slope.

Other trenchers include a pair of wheels at each end. Such devices are described, for example, in U.S. Pat. Nos. 5,226,248 and 5,355,597, the entirety of both of which is incorporated herein by reference. The device described in the foregoing patents is particularly suited for digging bed defining trenches. However, this device is not steerable. Therefore, to make arcs and curves with the device, it is necessary to slide the wheels to drag the device from side-to-side in order to cut a curved trench.

The problem of steering a trencher through arcs and curves is given as an example of the need for a steering mechanism for non-riding ground engaging equipment. As will be described in detail below, the present invention overcomes the deficiencies of and problems associated with the conventional technology noted above.

SUMMARY OF THE INVENTION

In one aspect of the present invention, a steering mechanism is provided for use on non-riding equipment for steering a pair of ground-engaging wheels through movement of a steering member. The steering mechanism includes substantially L-shaped axles coupled to each of the pair of wheels. A steering control means is coupled to one of the axles. Movement of the steering member is translated by the steering control means to cause the axle to which it is coupled to turn. An axle coupling means is provided for coupling the two axles together. The axle coupling means causes the other axle to turn in response to turning of the axle to which the steering control means is coupled. This results in steering movement with both of the pair of wheels moving together.

In another aspect of the present invention, the steering mechanism includes a steering locking means that locks the steering member and the pair of wheels in a fixed position. In the fixed position, the pair of wheels may be aligned with a longitudinal axis of the non-riding equipment.

In yet another aspect of the present invention, a steerable device is provided. The steerable device has a steering handle movably coupled to a frame. A pair of rotatable surface members move the device over the surface of the ground. An axle is coupled to each of the pair of rotatable surface members. A steering control means is coupled to one of the axles. Movement of the steering handle is translated by the steering control means to cause the axle to which it is coupled to turn. An axle coupling means is provided for coupling the two axles together. The axle coupling means causes the other axle to turn in response to turning of the axle to which the steering control means is coupled. This results in steering movement with both of the pair of rotatable surface members moving together. The steerable device can also include a steering locking means that locks the steering handle and the pair of rotatable surface members in a fixed position.

In a further aspect of the present invention, the steerable device is configured as a steerable device for digging a trench. Such a steerable device includes a rotor adapted to rotate about an axis of rotation so that the rotor digs the trench as it rotates.

Features and Advantages

The present invention has a number of features and advantages which distinguish it over conventional technology.

The steering mechanism of the present invention can be used on various types of non-riding equipment for steering a pair of ground-engaging wheels through movement of a steering member.

A trencher, or other type of non-riding equipment, configured with the steering mechanism of the present invention can make smoother and neater arcs and curves in a simple and easy manner, with less work than with conventional devices.

The steering mechanism of the present invention can be equipped with a locking mechanism so that the steering member and wheels can be locked in a fixed position. This is advantageous for using the non-riding equipment on slopes and hills. The locking mechanism is also advantageous for operating the non-riding ground engaging equipment in a straight line, such as for digging a trench for burying pipe or cable, or for landscaping.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention is directed to a steering mechanism for non-riding ground engaging equipment. The steering mechanism of the present invention is adapted for use on non-riding equipment for steering a pair of ground-engaging wheels through movement of a handle or other type of steering member. Movement of the steering member results in steering movement so that both of the pair of wheels move together. The steering mechanism can be locked through the use of a locking mechanism so that the steering member and the pair of wheels are locked in a fixed position. The invention will be described below with respect to its use on a device for digging a trench. However, it is to be understood that the steering mechanism of the present invention could be used on other types of non-riding ground engaging equipment, and is not limited to use on trenchers.

Figure 1:
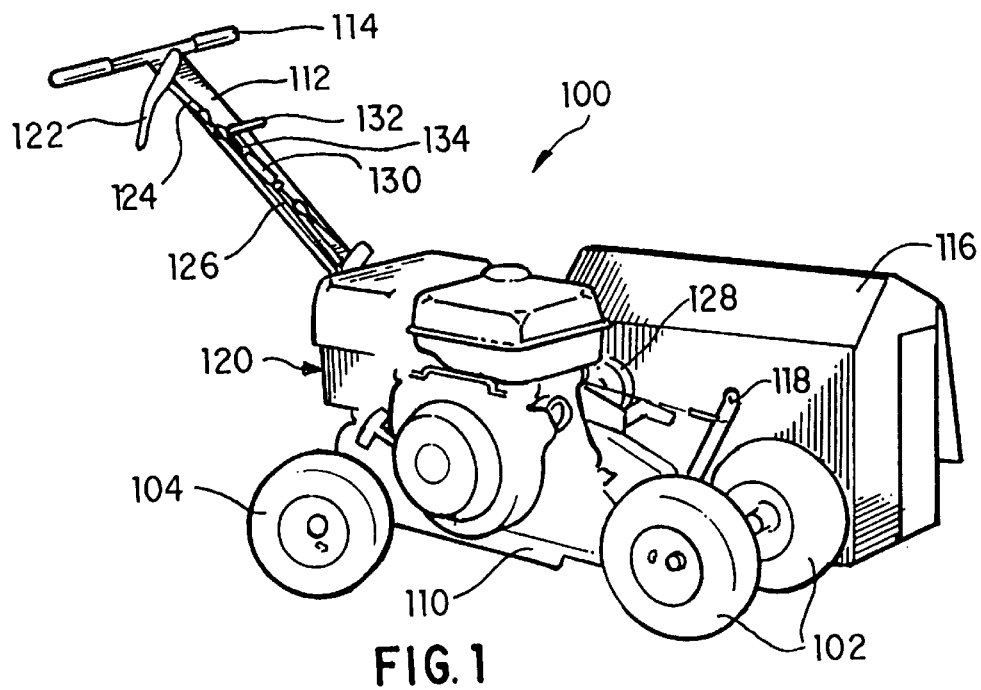
FIG. 1 shows a perspective view of a trencher equipped with a steering mechanism of the present invention.

With reference now to FIG. 1, a trencher 100 is shown. Trencher 100 includes a frame 110 to which is coupled a handle 112 that includes a handle bar 114 that is used by an operator. Handle 112 can be integral with or coupled to frame 110. Typically, a trencher such as is shown in FIG. 1 is pulled by the user as the user walks backward so that the user's legs are doing most of the work. When in use, a hood 116 and rubber drape are placed over the cutting rotor for safety from the rotor and flying debris. Hood 116 is attached to frame 110 by an upper hood brace 118. Hood 116 is also bolted directly to a portion of frame 110 near an engine 120.

Trencher 100 moves along the surface of the ground on two pairs of rotatable surface members or wheels. A first pair of wheels 104 is located at the handle end of the trencher, one on each side of the frame. The handle end of the trencher will be referred to herein as "rear" end of the trencher, relative to the perspective of a user standing behind the device in a normal operating position for pulling the device as the user walks backward. The second pair of wheels 102 is located at the "front" end of the trencher, relative to the perspective of a user standing behind the device in a normal operating position for pulling the device as the user walks backward. Similarly, as used herein, "left" and "right" will be relative to the perspective of a user standing behind the device in a normal operating position for pulling the device as the user walks backward. The front wheels are positioned closer together than the rear wheels, as front wheels 102 are both located on the side of the frame containing engine 120. This provides for stability, as well as sufficient clearance for mounting of the rotor and hood 116. Wheels 104 and 102 are preferably steel with pneumatic tires. However, other type wheels can be used, such as solid or plastic wheels.

Trencher 100 includes engine 120 to provide the power to rotate the rotor. Engine 120 rotates the rotor (shown in more detail in FIG. 2A) through use of a belt and pulley 128. Various types of engines can be used, such as gasoline, diesel, or electric. A clutch lever 122 and a clutch spring 124 provide a quick release through a clutch cable 126 to cut power to the rotor. When clutch lever 122 is released away from the handle by the user, the belt on the idler pulley goes slack, and no power is applied to the rotor.

Trencher 100 shown in FIG. 1 includes a locking mechanism that can be used in conjunction with the steering mechanism, as described in more detail below. The locking mechanism includes a steering lock rod 130 that is operated by a user through a steering lock rod handle 132. A steering lock rod biasing means, such as a spring 134, is used to bias the locking mechanism into the locked position. The locking mechanism will be described in more detail below with respect to FIGS. 7–10.

Figure 2B:
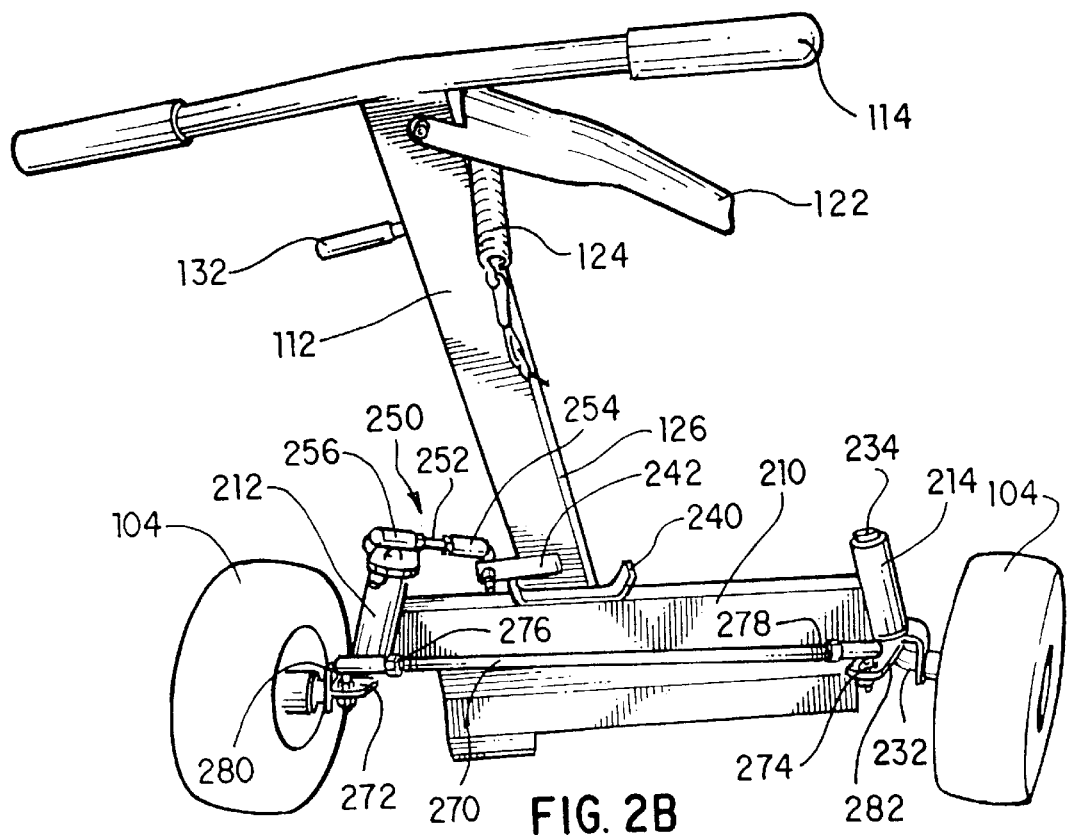
FIG. 2B shows a rear view of the trencher shown in FIG. 2A.
Figure 2A:
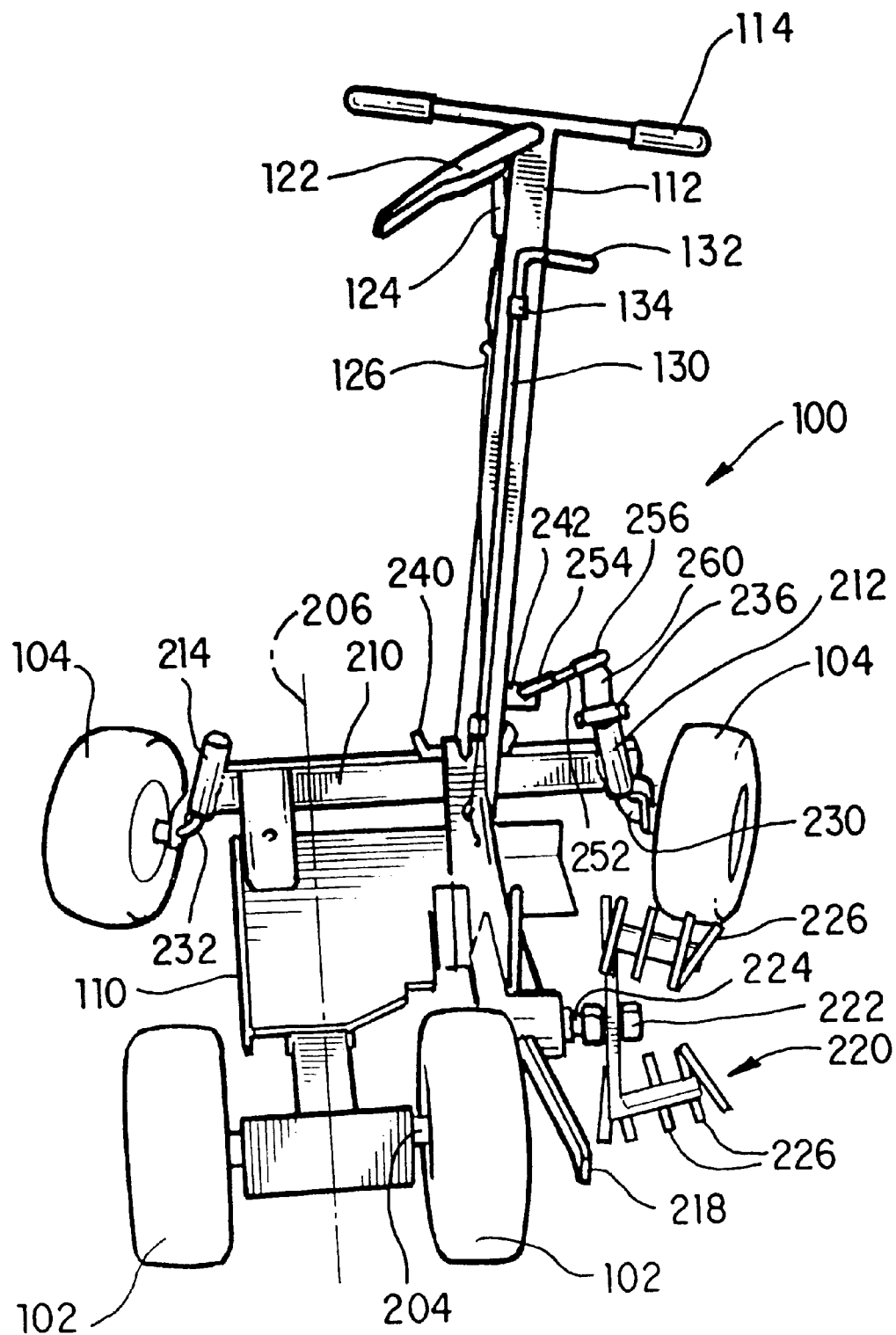
FIG. 2A shows a top view of the trencher shown in FIG. 1 with the hood and engine apparatus removed.

With reference now to FIG. 2A, trencher 100 is shown with the hood and engine apparatus removed. Wheels 102 are attached to frame 110 through the use of an axle 204. An engine-to-hood brace 218 is also used to attach hood 116 to frame 110.

With hood 116 removed, a rotor 220 is visible. Rotor 220 is configured to dig a trench that has a vertical face and a sloping face, such as a bed defining trench. Rotor 220 includes teeth-like elements 226 that are attached to the leading surface to contact the ground as the rotor rotates. A particularly preferred type of rotor is described in U.S. Pat. Nos. 5,226,248 and 5,355,597, the entirety of both of which is incorporated herein by reference. It is to be understood that other types of rotors can be used on trencher 100. For example, a root pruner, a clay rotor, a rock rotor, etc. can all be used on trencher 100. Rotor 220 is secured to a rotor spindle 224 with a rotor nut 222. Engine 120 is used to rotate rotor 220 about rotor spindle 224.

A rear portion 210 of frame 110 includes left and right tubular portions, 212 and 214, respectively. Wheels 104 are attached to rear frame portion 210 through the use of substantially "L"-shaped axles or axle spindles 230 and 232. Axles 230 and 232 are preferably formed from a rod or tube that is bent into a substantially "L" shape having a substantially horizontal portion and a substantially vertical portion.

The substantially horizontal portion of axles 230 and 232 are used to connect to wheels 104. The substantially vertical portions of axles 230 and 232 are received into tubular portions 212 and 214, respectively, of the frame. Axles 230 and 232 are preferably bent at an angle of about 105° so that there is about a 15° offset from the vertical. As best seen in FIG. 2B, the top portion of axle 232 is secured by use of a cotter key 234 that secures it in tubular portion 214.

To steer trencher 100, handle 112 is moved or pivoted left and right. A steering stop 240 is coupled to rear frame portion 210 to limit movement of handle 112. As shown in more detail in FIGS. 3 and 4, steering stop 240 can be formed from flat bar that is bent up at either end. Steering stop 240 limits the travel of handle 112 for steering wheels 104. In this manner, the angle to which wheels 104 can be turned or steered is limited, thereby preventing wheels 104 from buckling inward.

A steering control means is used to translate movement of handle 112 to cause one of the axles to turn. Particularly, as shown in FIGS. 2A and 2B, a steering connecting rod 250 and a steering control arm 260 are used to couple axle 230 to handle 112. Axle 230 is secured to steering control arm 260 through the use of a bolt assembly 236 (shown in more detail in FIGS. 3 and 4). Steering connecting rod 250 includes a tie rod end 256 that is coupled to steering control arm 260 through the use of a ball joint connector. A tie rod end 254 of steering connecting rod 250 is coupled to a steering rod connecting point 242 that is coupled to handle 112. Steering connecting rod 250 includes a threaded stud 252 onto which tie rod ends 254 and 256 are threaded. Threaded stud 252 forms an adjusting region of steering connecting rod 250 that allows for adjusting the travel of wheels 104 in response to movement of handle 112. In this manner, the amount of turning movement of wheels 104 per unit movement of handle 112 can be adjusted.

The steering mechanism of the present invention is configured so that movement of handle 112 causes both of wheels 104 to move together. To do so, an axle coupling means is provided that couples axle 230 to axle 232 and causes axle 232 to turn in response to turning of axle 230. This configuration results in steering movement with both of the pair of wheels 104 moving together. One embodiment of an axle coupling means is shown in FIG. 2B. A steering tie rod 270 is coupled at either end to axles 230 and 232. A ball joint connector 272 is used to couple one end of steering tie rod 270 to a steering tie rod connecting arm 280 that is attached to axle 230. Preferably, steering tie rod connecting arm 280 is welded to axle 230. Similarly, a ball joint connector 274 couples one end of steering tie rod 270 to a steering tie rod connecting arm 282 that is attached to axle 232. Steering tie rod connecting arm 282 can also be welded to axle 232. As will be explained in more detail below with respect to FIGS. 5 and 6, ball joint connectors 272 and 274 allow for pivotal movement of steering tie rod 270 so that turning of axle 230 results in turning of axle 232.

Steering tie rod 270 includes threaded ends 276 and 278. Threaded ends 276 and 278 provide an adjusting mechanism for adjusting the alignment of wheels 104. In this manner, an adjustment can be made to insure that wheels 104 are perfectly square and straight with respect to trencher 100. This is analogous to adjusting the "toe-in" on a car. When wheels 104 (and wheels 102) are aligned or straight, they are aligned or parallel with a longitudinal axis 206 (see FIG. 2A) of trencher 100.

Figure 3:
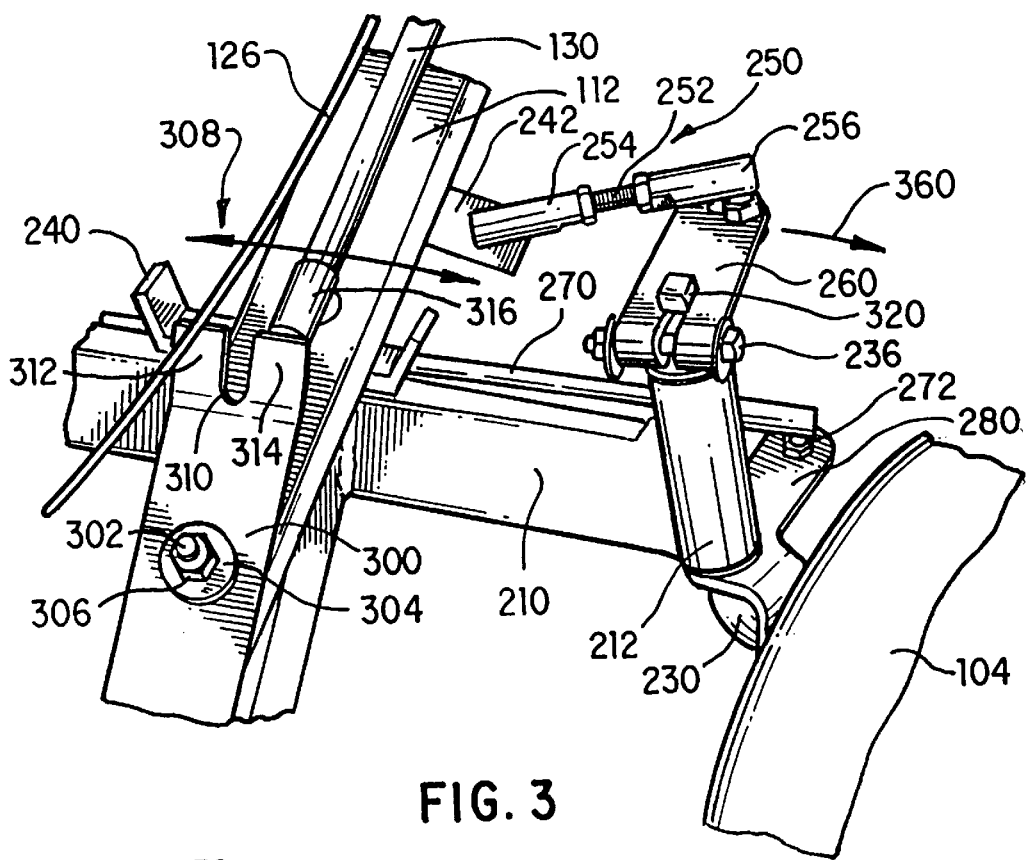
FIGS. 3 and 4 show a partial cutaway view of the trencher shown in FIG. 2A to illustrate one embodiment of a steering mechanism of the present invention.
Figure 4:
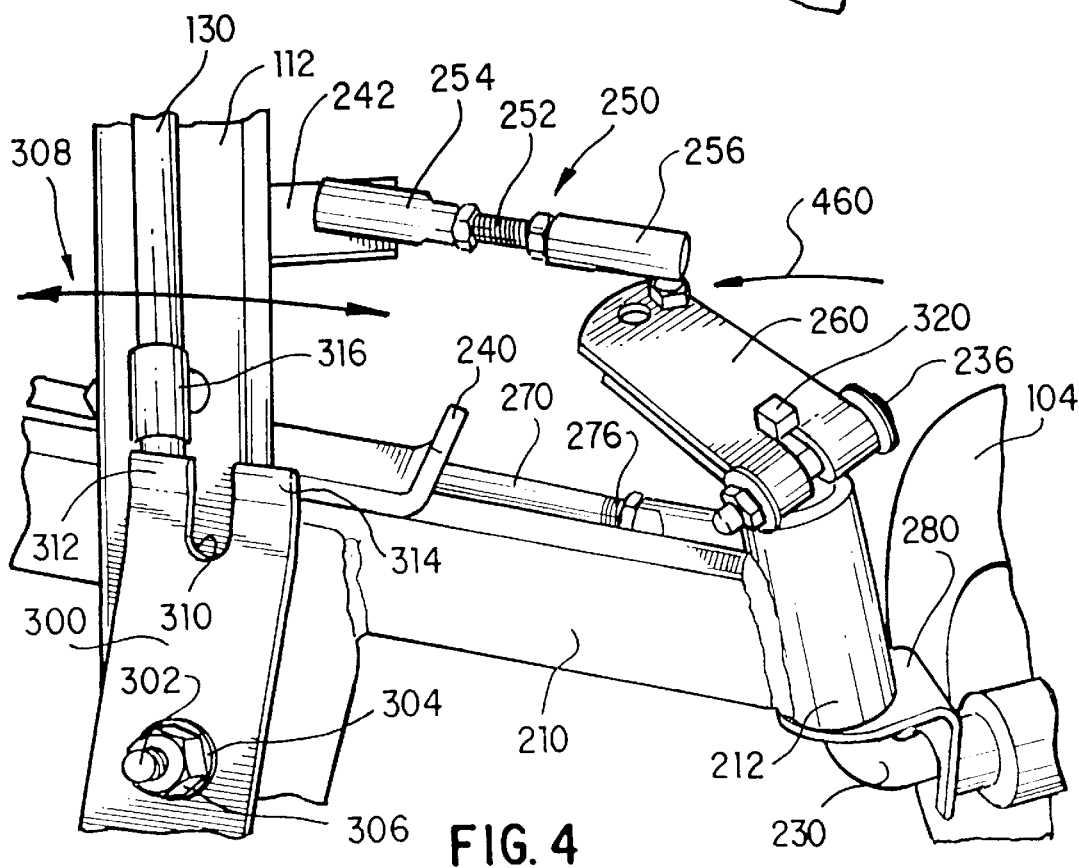

The steering control means of the present invention can be seen in more detail in FIGS. 3 and 4. The substantially vertical portion of axle 230 extends upward through tubular portion 212 which includes a plastic bushing (not shown) on the upper and lower ends. The top of the substantially vertical portion of axle 230 has a square terminal 320. Steering control arm 260 has a slot for accommodating square terminal 320. Axle 230 is held in place by bolt assembly 236.

Handle 112 pivots left and right as shown generally by arrow 308 in FIGS. 3 and 4. The extent of travel or movement of handle 112 is limited in both directions by steering stop 240. Handle 112 is secured to rear frame portion 210 through the use of a pivot bolt 302 and a pivot brace plate 300. Pivot brace plate 300 defines a hole through which pivot bolt 302 is received. A flat washer 304 and a nylon lock nut 306 secure handle 112 so that it is disposed between pivot brace plate 300 and rear frame portion 210. Handle 112 pivots about pivot bolt 302 to result in steering movement of handle 112 in the directions shown by arrow 308.

Figure 5:
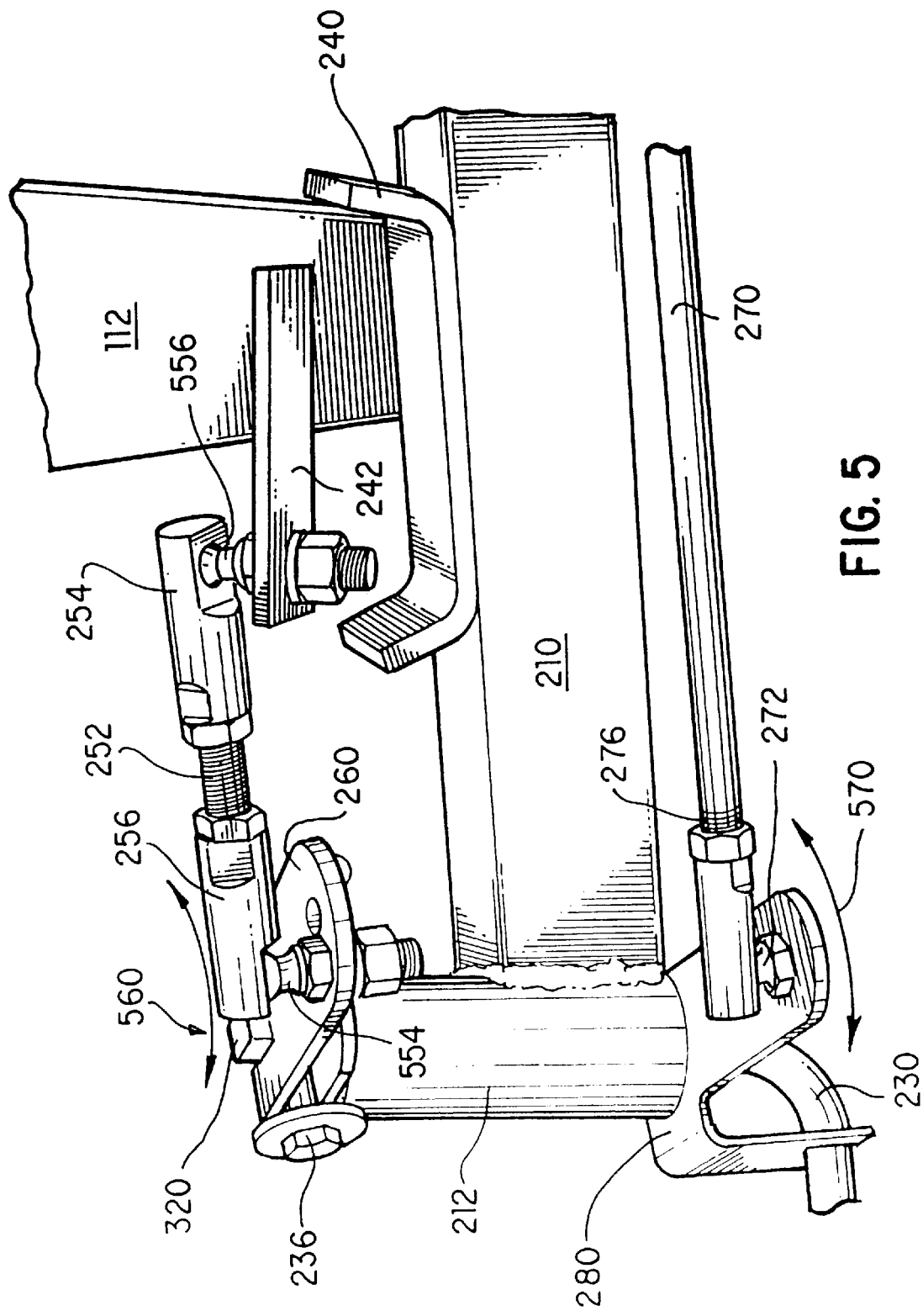
FIGS. 5 and 6 show a partial cutaway view of the trencher shown in FIG. 2B to further illustrate one embodiment of the steering mechanism of the present invention.

When handle 112 is moved in the direction shown by arrow 360 in FIG. 3, the movement of handle 112 is translated by steering connecting rod 250 and steering control arm 260 to move axle 230, thereby turning wheel 104. Similarly, turning handle 112 in the direction shown by arrow 460 in FIG. 4, the movement of handle 112 is translated by steering connecting rod 250 and steering control arm 260 to turn axle 230 and wheel 104 in the opposite direction from that in FIG. 3. In this manner, steering control rod 250 and steering control arm 260 function to translate the movement of handle 112 to axle 230 thereby causing wheel 104 coupled to axle 230 to turn. The movement of handle 112 is translated to axle 230 through the use of ball joint connectors as shown in FIG. 5. A ball joint connector 556 is used to couple tie rod end 254 of steering connecting rod 250 to steering rod connecting point 242. A ball joint connector 554 is used to couple steering tie rod end 256 of steering connecting rod 250 to steering control arm 260. Through the use of ball joint connectors 556 and 554, movement of handle 112 results in movement of steering connecting rod 250, which results in movement of steering control arm 260. The movement of steering control arm 260 turns axle 230, thereby turning wheel 104 that is attached to axle 230. The movement of steering control arm 260 that is translated into turning movement of axle 230 and wheel 104 is shown in FIG. 5 as arrow 560.

Figure 6:
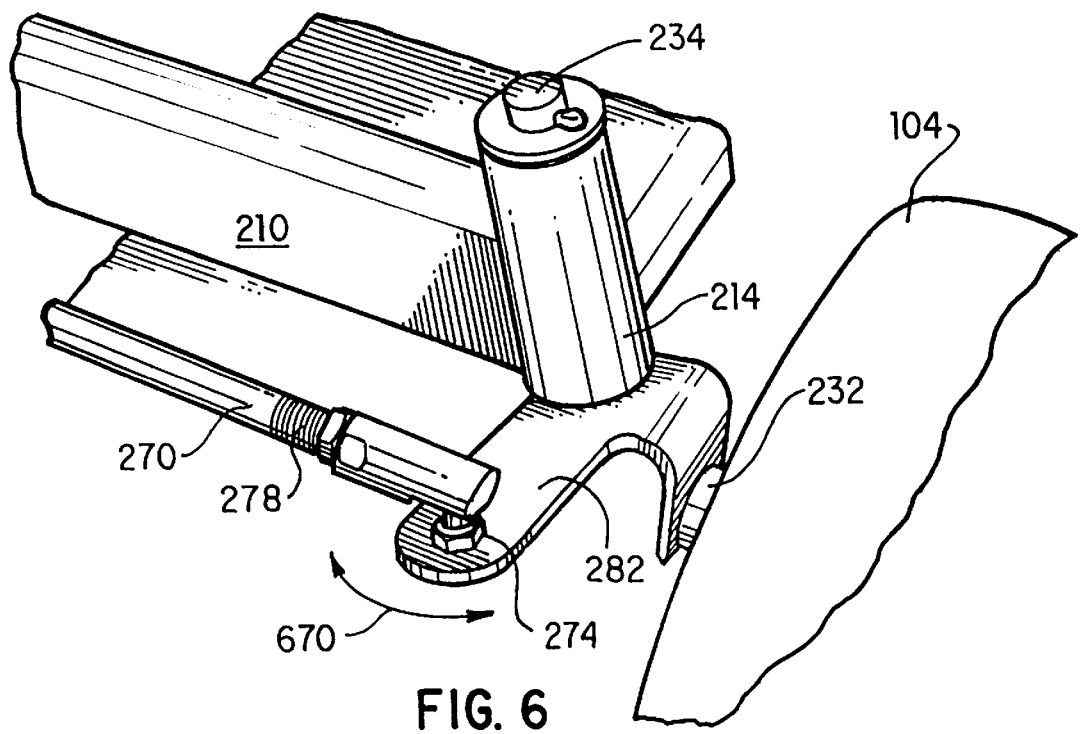
Figure 7:
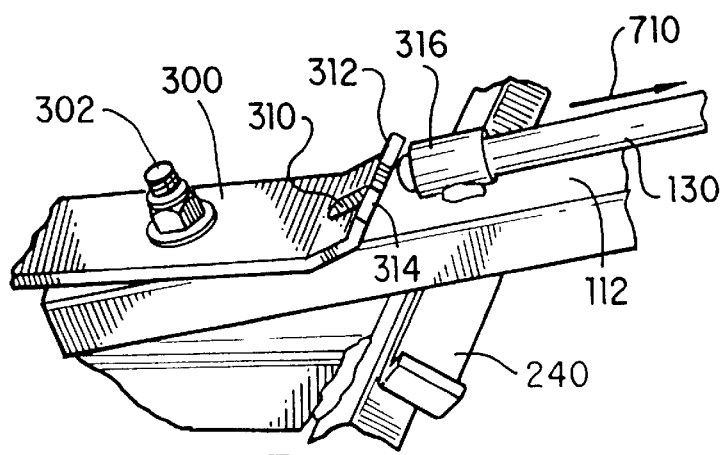
FIGS. 7, 8, 9, and 10 illustrate a partial cutaway view of the trencher shown in FIG. 2A to illustrate one embodiment of a locking mechanism of the present invention.

FIGS. 5 and 6 illustrate how the axle coupling means of the present invention causes axle 232 to turn in response to turning of axle 230. As shown in FIG. 5, steering tie rod 270 is coupled to steering tie rod connecting arm 280 by ball joint connector 272. Steering tie rod connecting arm 280 is connected to axle 230. As axle 230 turns, in response to movement of handle 112, steering tie rod connecting arm 280 moves as shown by arrow 570. Through ball joint connection 272, this movement is translated by steering tie rod 270 to steering tie rod connecting arm 282 shown in FIG. 6. Steering tie rod 270 is coupled to steering tie rod connecting arm 282 by ball joint connector 274. The movement of steering tie rod connecting arm 282, shown by arrow 670, is translated to axle 232 resulting in movement of wheel 104 connected to axle 232. In this manner, wheels 104 are "slaved together" so that the steering movement results in both of wheels 104 moving together.

The steering mechanism of the present invention is preferably configured with a steering locking means that locks handle 112 and wheels 104 in a fixed position. In a preferred embodiment, the fixed position is one in which wheels 104 are aligned with longitudinal axis 206. In such a fixed position, trencher 100 is configured to run in a substantially straight line. However, it is to be understood that the present invention is not limited to having the fixed position be with the wheels aligned for operation in a straight line.

As shown in FIGS. 3 and 4, pivot brace plate 300 defines a slot 310. Slot 310 is formed by bending upward ears 312 and 314 of pivot brace plate 300. In this manner, steering lock rod 130 can be positively received within slot 310 with ears 312 and 314 extending above the full diameter of steering lock rod 130. To lock handle 112 in a fixed position, steering lock rod 130 is pushed downward so that it fully extends into slot 310. Steering lock rod 130 passes through a tubular guide 316 that is attached to handle 112.

Figure 8:
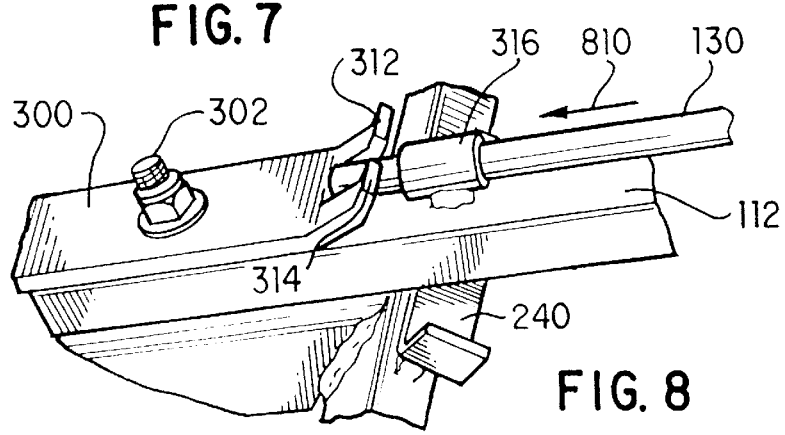

The operation of the steering locking means of the present invention is shown in more detail in FIGS. 7–10. As shown in FIG. 8, the steering mechanism is locked by moving steering lock rod 130 in direction 810 so that it is fully received within slot 310 of pivot brace plate 300. When steering lock rod 130 is locked into slot 310 as shown in FIG. 8, handle 112 is prevented from pivoting about pivot bolt 302. To unlock the device, steering lock rod 130 is withdrawn in the direction shown by arrow 710 in FIG. 7. When steering lock rod 130 iswithdrawn from slot 310, handle 112 is free to pivot about pivot bolt 302.

Figure 9:
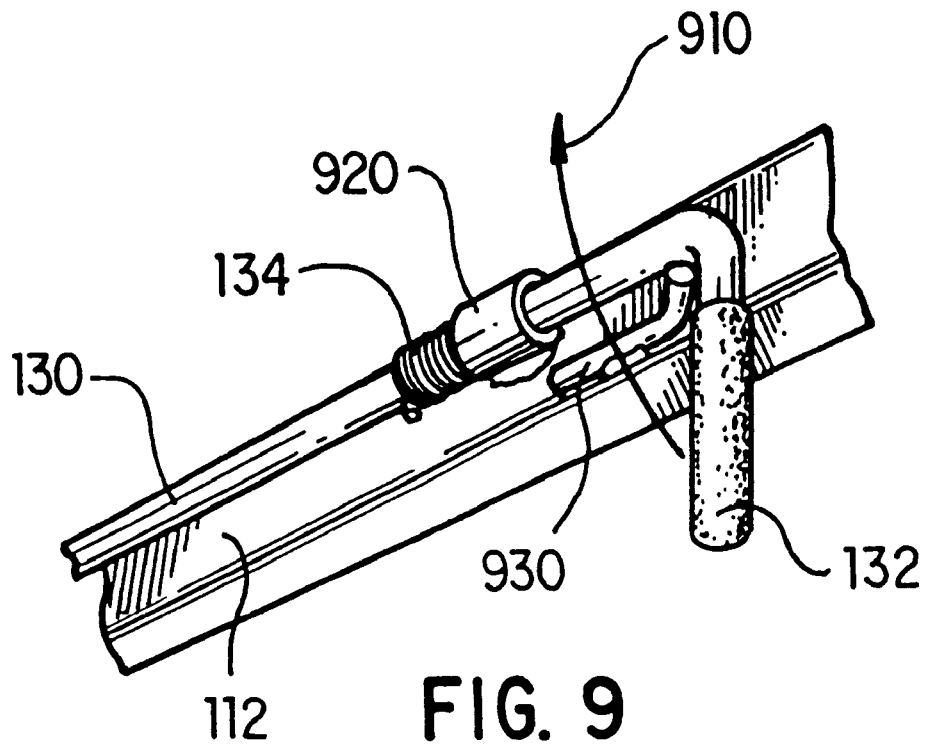
Figure 10:
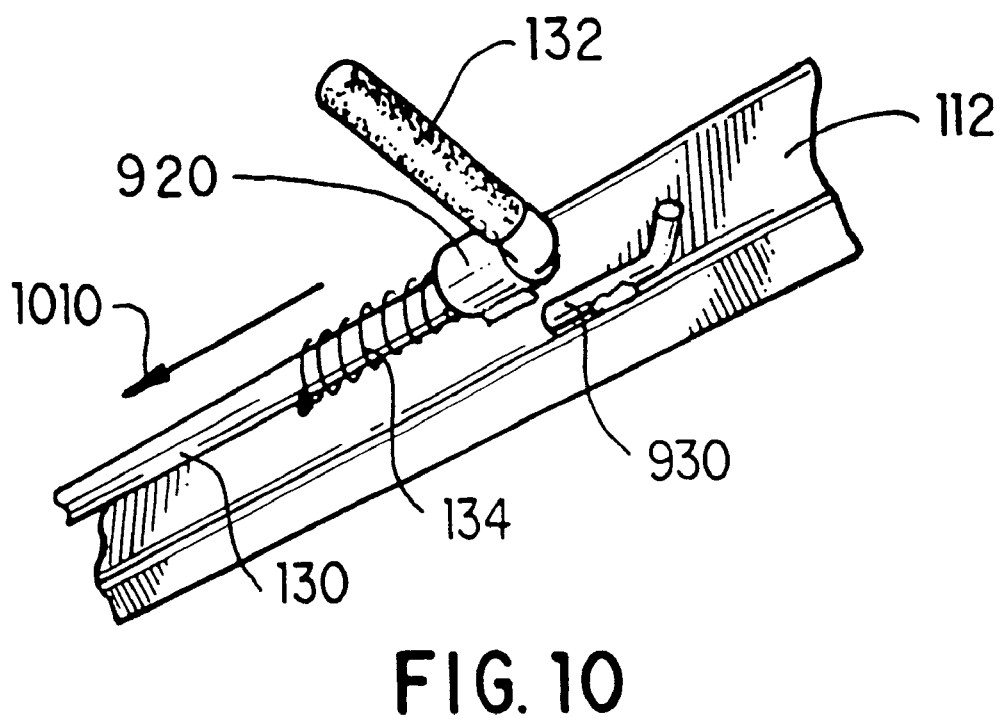

As best seen in FIGS. 9 and 10, a steering lock rod biasing means is used to bias steering lock rod 130 within slot 310 to hold steering lock rod 130 in the locked position. As shown in FIG. 10, steering lock rod spring 134 biases steering lock rod 130 downward in the direction shown by arrow 1010 to retain steering lock rod 130 within slot 310 in the locked position. In the unlocked position, as shown in FIG. 9, steering lock rod spring 134 is compressed against a steering lock rod guide 920. Steering lock rod 130 is secured in the unlocked position by securing steering lock rod handle 132 against a holding means 930 that is coupled to handle 112. Holding means 930 can include, for example, a catch, a holding pin, a slot, a groove, a tab, etc., and is not limited to the configuration shown in the figures.

To move steering lock rod 130 from the unlocked position shown in FIG. 9 to the locked position shown in FIG. 10, steering lock rod handle 132 is rotated upward and around in the direction shown by arrow 910. The steering lock rod handle is then moved downward in direction 1010 so that steering lock rod handle 132 rests against steering lock rod guide 920. To move steering lock rod 130 from the locked position shown in FIG. 10 to the unlocked position shown in FIG. 9, the process is reversed. Steering lock rod 130 is pulled upward in a direction opposite to direction 1010, thereby compressing steering lock rod spring 134. Steering lock rod handle 132 is then rotated in a direction opposite to direction 910, and secured by holding means 930.

Conclusion

While various embodiments of the present invention have been described above, it should be understood that they have been presented by way of example only, and not limitation. The steering mechanism of the present invention could be used on other types of non-riding ground engaging equipment, such as mowers, edgers, and the like, and is not limited to use on trenchers. Thus, the breadth and scope of the present invention should not be limited by any of the above-described exemplary embodiments, but should be defined only in accordance with the following claims and their equivalents.

What is claimed is:

1. A steerable device for digging a trench, comprising:

a frame having first and second end portions;

first and second axles coupled to said frame at said first end portion;

first and second rotatable surface members coupled to said first and second axles, respectively, for moving the device over the surface of the ground;

a steering handle movably coupled to said frame adjacent said first end portion;

a rotor adapted to rotate about an axis of rotation so that said rotor digs the trench as it rotates;

a steering control means, coupled to said axles for translating movement of said steering handle into a turning motion of said axles; and a pivot member coupled to said frame and said steering handle, about which said steering handle pivots.

2. The steerable device of claim 1, wherein said pivot member comprises:

a pivot bolt about which said steering handle pivots; and a pivot brace plate defining a hole for receiving therethrough said pivot bolt, wherein said steering handle is disposed between said pivot brace plate and said frame.

3. The steerable device of claim 1, wherein said steering control means comprises:

a steering control arm coupled to one of said first and second axles, a steering connecting rod, wherein one end of said steering connecting rod is movably coupled to said steering control arm, and another end of said steering connecting rod is movably coupled to said steering handle; and axle coupling means for coupling said one axle to the other of said first and second axles.

4. The steerable device of claim 3, wherein said axle coupling means comprises:

a steering tie rod, wherein a first end of said steering tie rod is movably coupled to said first axle, and a second end of said steering tie rod is movably coupled to said second axle.

5. The steerable device of claim 4, wherein said axle coupling means further comprises:

a first steering tie rod connecting arm;

a first ball joint connector for connecting said first end of said steering tie rod to said first steering tie rod connecting arm;

a second steering tie rod connecting arm; and a second ball joint connector for connecting said second end of said steering tie rod to said second steering tie rod connecting arm.

6. The steerable device of claim 1, further comprising a steering stop for limiting the movement of said steering handle.

7. The steerable device of claim 1, further comprising steering locking means for locking said steering handle and said pair of rotatable surface members in a locked position.

8. The steerable device of claim 7, wherein said steering locking means comprises:

a steering lock rod coupled to said steering handle, said steering lock rod movable between a locked position and an unlocked position;

a steering lock rod slot for receiving said steering lock rod;

a steering lock rod biasing means for biasing said steering lock rod within said slot, thereby holding said steering lock rod in the locked position.

9. The steerable device of claim 8, wherein said steering lock rod biasing means comprises a spring.

* * * * *